Dec. 13, 1966 A. A. JORGENSEN 3,291,916
SIGNALING SYSTEM
Filed Aug. 23, 1963
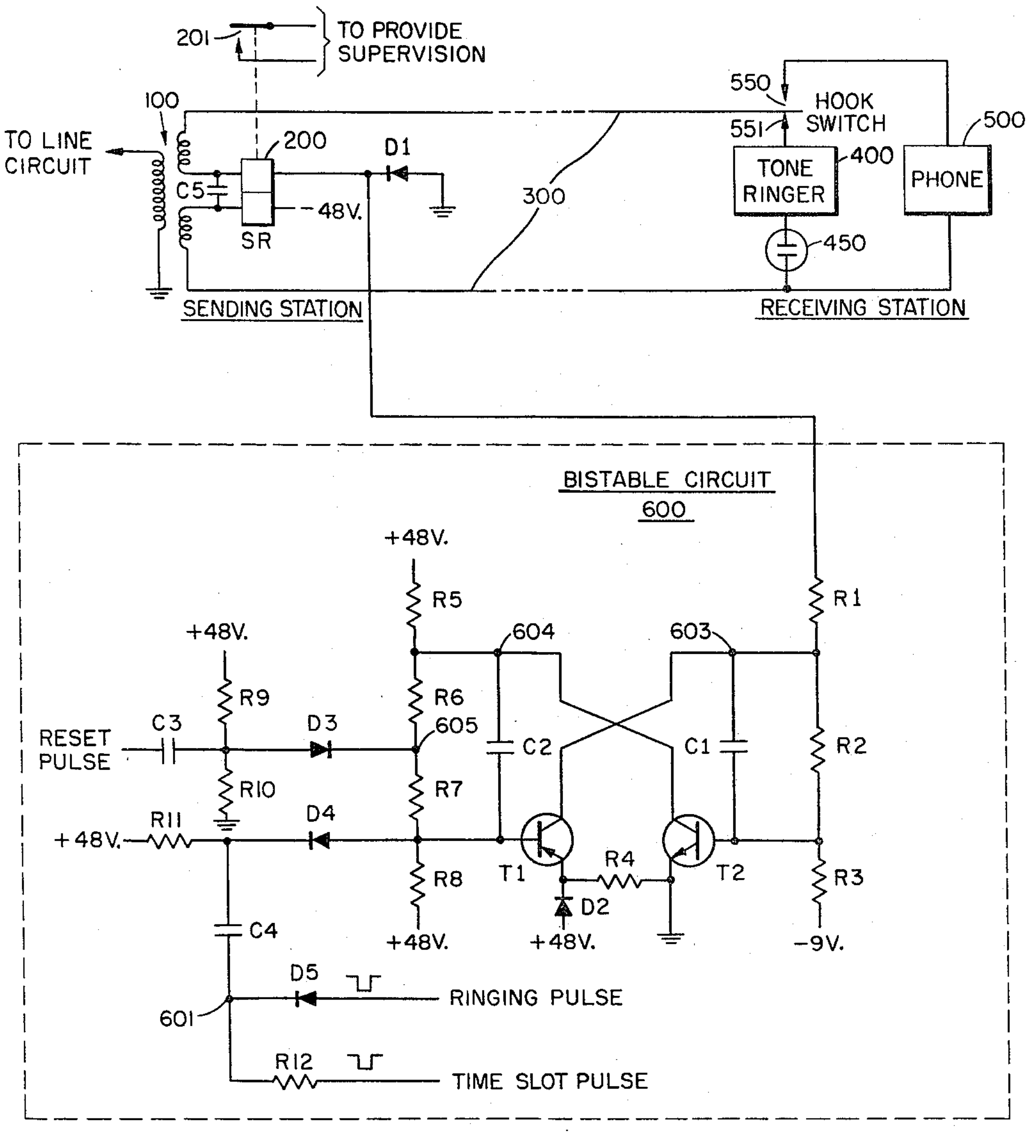
TIME SLOT PULSE =1µs PULSE EVERY 100µs
RESET PULSE =APPROX. 20ms PULSE EVERY 40ms
RINGING PULSE =1sec. PULSE EVERY 6 sec.
INVENTOR.
ADAM A. JORGENSON
BY
George W. Killian
AGENT 3,291,916
Patented Dec. 13, 1966

3,291,916

SIGNALING SYSTEM

Adam A. Jorgensen, Charlottesville, Va., assignor, by mesne assignments, to Stromberg-Carlson Corporation, Rochester, N.Y., a corporation of Delaware Filed Aug. 23, 1963, Ser. No. 304,140
12 Claims. (Cl. 179—86)

This invention relates in general to signaling systems and, more particularly, to means for superimposing a signaling system on a communication system.

Although the invention disclosed herein is suitable for more general application, it is particularly adapted for use in a telephone system and, more particularly, in an electronic telephone system.

In prior art telephone systems it is well known to use a single pair of wires from the central office to the subscriber's station and to use the same pair both for signaling and for voice communication. Relay systems for accomplishing the required switching are well known to those skilled in the telephone art. Briefly, such systems depend upon the fact that the ringing circuit includes a capacitor, or other device, to block direct current while the talking and supervision circuit does not block the flow of direct current. Thus the alternating current ringing potential may be superimposed on a direct current potential and applied to the line through the winding of a relay which is designed to respond only to the flow of direct current therethrough. Therefore, when a call is answered by removing the handset, a group of hookswitch contacts are operated and a direct current circuit is completed which operates the aforementioned relay. In response to the operation of the relay, the alternating current ringing signal is caused to be removed from the line.

In electronic telephone systems few if any relays are used, and those that are small enough to find acceptance have either a very limited number of contacts or are not sensitive enough to satisfy the requirements. Accordingly, the time-honored techniques are not applicable in electronic telephone systems. Furthermore, a different ringing or signaling technique is desirable in electronic telephone systems. More specifically, electronic techniques do not lend themselves to the passage of the relatively large amounts of power which are required to operate conventional telephone ringers. Accordingly, special signaling devices which have become known in the art as tone ringers have found acceptance. The Bell Laboratories Record for February 1957 includes an article describing tone ringers and several patents have been issued which disclose specific types of tone ringers. The cited article describes a tone ringer that is frequency sensitive. Other tone ringers have been designed to respond to particular applied potentials. Tone ringers received considerable publicity when they were first installed on a trial basis, as the ringers emit an unusual but effective and pleasant attention attracting tone. Various types of tone ringers may be used in conjunction with the invention disclosed herein and therefore the tone ringer is indicated in block diagram form as the details of the construction of the circuit therefor do not form a part of the invention.

Many patents have been issued disclosing electronic switching techniques. Among them are Patent 3,041,403 issued to Frankel on June 26, 1962, Patent 3,047,669 issued to Schneider on July 31, 1962, Patent 3,066,192 issued to Bartlett et al. on November 27, 1962 and Patent 3,087,022 issued to Brightman et al. on April 23, 1963.

It is the general object of this invention to provide a new and improved signaling system.

It is a more particular object of this invention to provide a new and improved signaling system for use in a communications system.

It is another object of this invention to provide a new and improved signaling system for use in an electronic communications system.

It is another object of this invention to superimpose a signaling system on a communications system.

It is another object of this invention to superimpose a signaling system on an electronic communications system of the time division multiplex type.

In accordance with the present invention, a tone ringer may be employed at the station to be signaled, which in a telephone system will include a subscriber's station telephone instrument. The tone ringer will be of a type which is triggered into operation when the applied potential rises above a predetermined level. When the station is to be signaled, pulses having a high pulse repetition rate, such as time division multiplexed pulses in an assigned time slot, will be applied to a device associated with the called line to cause a potential above said predetermined level to be applied to the line. When the call is answered the mentioned pulses will be stopped and the cited device will reduce the potential applied to the line to a level below said predetermined level, thereby causing the tone ringer to stop sounding.

Further objects and advantages of the invention will become apparent as the following description proceeds, and features of novelty which characterize the invention will be pointed out with particularity in the claims annexed to and forming a part of this specification.

For a better understanding of the invention reference may be had to the accompanying drawing which illustrates an embodiment of the invention. It is to be understood that only the details of the circuit necessary to understand the invention have been shown. For example, the details of the telephone circuit at the subscriber's station have not been shown and neither are the details of the dialing and switching equipment illustrated. These details are believed to be well known to those skilled in the art to which this invention appertains and/or are believed to be fully disclosed in one or more of the cited patents.

It is believed that the operation of the system can best be understood by considering the accompanying drawing together with the following detailed description.

The invention, when incorporated in a telephone system, includes a line transformer or repeat coil 100, a line supervision relay 200, a two-conductor line 300 connecting the sending and receiving stations, a tone ringer 400 at the receiving station, a telephone instrument 500 at the receiving station, and a bistable circuit 600 at the sending station.

The bistable circuit 600 is controlled by pulses from three sources. The first source provides pulses at a high pulse repetition rate such as time division multiplex pulses in a given time slot of a repetitive time frame. In a typical time division multiplex telephone system these pulses will occur within a one microsecond interval once each 100 microseconds. The second source of pulses will provide a pulse for approximately one second every six seconds. The third pulse source will provide a pulse of approximately 20 milliseconds duration once every 40 milliseconds. The second pulse is an enabling pulse which controls the signaling and silent intervals of the signaling device 400. The third pulse source provides means for turning off the signaling device at the end of the signaling period and provides modulation. The first pulse source is utilized to turn on the bistable circuit 600 when enabled to do so by the enabling or ringing pulse from the second source.

The potential applied to the ringing pulse lead is a ground potential and is reduced to a negative potential for approximately one second every six seconds. Accordingly, when the ringing bus is at a ground potential, the point 601 will be held at a ground potential irrespective of the fact that negative time slot pulses may be applied to point 601 through resistor R12. More specifically, if a negative pulse is applied through resistor R12 the diode D5 will be forward biased thereby holding the point 601 at ground potential. Conversely, if the ring bus is reduced to a negative potential and there are no negative time slot pulses applied through resistor R12, the diode D5 will be back biased and the point 601 will remain at ground potential. However, when the ringing bus applies a negative potential to diode D5 and at the same time a negative time slot pulse is applied to resistor R12, the point 601 will be driven negative. While point 601 is at ground potential, and if it is assumed that the bistable circuit 600 has been reset, the P-N-P transistor T1 will be held cut off as the emitter will be at a potential slightly less than +48 volts. That is, a small current will flow from the +48 volt source through diode D2 and resistor R4 to ground, thereby reducing the emitter potential to a value slightly less than +48 volts. The base of transistor T1 will be held at +48 volts, the potential applied to resistor R8, and therefore the base will be slightly positive with respect to the emitter and the transistor T1 will be held cut off as the base must be negative with respect to the emitter to permit conduction. The N-P-N transistor T2 will also be held cut off. There will be a small current from ground through diode D1 and the voltage divider network comprising resistors R1, R2 and R3 to the −9 volt source. Accordingly, the base of transistor T2 will be held at a slightly negative potential while the emitter is directly connected to ground and, therefore, the transistor T2 will be held cut off as the base of the N-P-N transistor must be positive with respect to the emitter to permit conduction. The dioded D3 will be back biased as a result of the current flow through resistors R9 and R10.

As the point 601 is driven negative by the concurrent application of negative pulses from the time slot pulse source and the ringing bus, a negative pulse will be passed through capacitor C4 and a pulse of current will flow from the +48 volt source through resistor R8 and diode D4. The flow of current through resistor R8 will reduce the potential of the base of transistor T1 to a potential below that of the emitter, thereby triggering the transistor T1 into conduction. The capacitor C2 provides a shunt around resistors R6 and R7 to assist the turning on of transistor T1. Resistor R11 is large compared with resistor R8.

With transistor T1 turned on the point 603 is suddenly raised to a potential of approximately +48 volts which back biases diode D1 and causes a current flow through resistors R2 and R3. The result is that the base of transistor T2 is made positive with respect to its emitter, thereby turning it on. With transistor T2 turned on, point 604 is reduced to ground potential, the potential of the emitter of transistor T2. The ground potential at point 604 causes resistors R6, R7 and R8 to serve as a voltage divider to hold the base of transistor T1 at a negative potential with respect to the emitter, thereby holding transistor T1 on. Thus the conduction of transistor T1 holds transistor T2 on and the conduction of transistor T2 holds transistor T1 on. Capacitor C1 serves to shunt resistor R2 to assist in turning on transistor T2.

With the bistable circuit 600 turned on so that both transistors are conducting, the diode D3 will be back biased and the potential at point 603 will be held at approximately +48 volts. Therefore, with the circuit 600 turned on, a 96 volt potential will be applied across the conductors 300. More specifically, a +48 volt potential will be applied to one of the lines while a −48 volt potential will be applied to the other one of the lines of the pair 300.

When a positive, or reset pulse, is applied on the reset lead, the diode D3 will be forward biased, which will cause the potential at point 605 to be raised. The increased potential at point 605 will raise the potential of the base of transistor T1 so that it is no longer negative with respect to its emitter, thereby causing transistor T1 to be turned off. Turning off transistor T1 will, of course, turn off transistor T2 since transistor T1 served to hold transistor T2 on. Accordingly, in response to a positive pulse on the reset lead, the bistable circuit 600 will be turned off and the potential applied to line pair 300 will be reduced to 48 volts.

Therefore, as has been shown, when the bistable circuit is shifted from its set to its reset state the potential applied between the line conductors 300 is shifted from 96 volts to 48 volts. More specifically, when the circuit 600 is reset, a ground potential is applied through diode D1, the upper winding of relay 200, and a winding on transformer 100 to the upper line of the pair 300; and at the same time, −48 volts is applied through the lower winding of relay 200 and a winding on transformer 100 to the lower line of the pair 300. The 48 volt potential is insufficient to break down the device 450 to start conduction and activate the tone ringer 400. However, when the circuit 600 is set and a +48 volt potential is substituted for the ground potential, a 96 volt potential is applied between the lines 300 and the break down device 450 starts to conduct and therefore the tone ringer 400 is activated and starts to emit its signal. However, the impedance of the ringer in sufficiently high that insufficient current will flow in the loop to energize relay 200 at this time. The break down device may be a neon tube or the circuit may be arranged to incorporate a Zener diode. When the call is answered by raising the handset (not shown) of the telephone instrument 500, the hook-switch opens and closes contacts 551 and 550, respectively. This disconnects the high impedance tone ringer and closes a low impedance direct current circuit providing sufficient current to operate the supervisory relay 200. Operation of the relay 200 closes the contacts 201 which operate (by means not shown and which do not form a part of this invention) to terminate the time slot pulses that set the bistable circuit 600.

In order to provide a modulated tone, the bistable circuit 600 is reset once each 40 milliseconds and is held reset for approximately half of the 40 millisecond interval by the pulses applied to the reset bus.

The relay 200 may be of any convenient type such as a conventional telephone relay or the more compact reed relay type. If two-party operation is desired, the circuit could be modified to operate the tone ringers on a divided basis.

The tone ringer, when energized in accordance with the teachings of this invention, will be practically independent of line loop resistance. The circuit provides a high degree of immunity to talk down and noise, that is, since the ringer is voltage sensitive there will be a minimum tendency for speech or random noise to trigger the tone ringer into operation.

While there has been shown and described what is considered at present to be a preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a signaling system, a signal sending station, a signal receiving station, a two-conductor line for coupling said sending and receiving stations, a signaling device coupled to said line at the receiving end thereof responsive only to applied potential above a predetermined potential, a source of potential having a full value above said predetermined potential at said sending station, a first source of pulses at said sending station, means normally connecting said source of potential to one conductor of said line so as to apply less than said predetermined value of potential thereto, and bistable coupling means coupled to said first pulse source, said potential source, and said line at said sending station end, said coupling means being actuated in response to pulses from said first source for applying the full potential of said potential source to said line to actuate said signalling device.

2. The combination as set forth in claim 1 and including a second source of pulses coupled to said coupling means said coupling means being responsive to pulses from said second source for removing the potential of said first potential source from said line.

3. The combination as set forth in claim 2 wherein said source of potential at said sending station includes opposite polarity sources each having a value below said predetermined potential but a combined value in excess of said predetermined value, and means for coupling only the potential of said second source to said line, said first source being connected to said line through said coupling means.

4. The combination as set forth in claim 3 wherein the pulses of said first pulse source are generated at a pulse repetition rate which is greater than the pulse repetition rate of said second pulse source.

5. The combination as set forth in claim 4 and including a third pulse source which produces a pulse which is substantially longer than that of said second pulse source and which has a pulse repetition rate which is less than that of said second pulse source, and gating means for gating pulses from said first pulse source to said coupling means only upon coincident receipt of the pulses from said first pulse source and pulses from said third pulse source.

6. In a signaling system, a signal sending station, a signal receiving station, a two-conductor line connecting said sending and receiving stations, bistable switching means coupled to said line at said seconding station, first and second sources of repetitive signals with said first source having a repetition rate which is greater than the repetition rate of said second source, means for selectively coupling signals from said first signal source to said switching means for setting said switching means to a first of its bistable states, means for coupling signals from said second signal source to said switching means for setting said switching means to a second of its bistable states, first and second sources of potential at said sending station, said switching means including means for selectively coupling the combined potential from said first and second potential sources to said line when said switching means is set to said second stable state and for coupling only one of said potential sources to said line when said switching means is set to said first stable state, and a signaling device coupled to said line at said receiving station for providing a distinctive signal only in response to the application of the combined potential of said first and second potential sources to said line.

7. The combination as set forth in claim 6 and including a third source of repetitive signals having a repetition rate which is greater than that of said second source, and gating means for gating pulses from said first signal source to said switching means only upon coincidence between signals from said second signal source and a signal from said third signal source.

8. The combination as set forth in claim 7 wherein pulses from said third source are time division multiplex pulses in a given time slot of a repetitive time frame and wherein said switching means comprises an electronic circuit having first and second conductive elements which are rendered conductive and non-conductive in responses to said coincident signals and signals from said second signal source, respectively.

9. In a signaling system, a signal sending station, a signal receiving station, a two-conductor line for coupling said sending and receiving stations, a signaling device coupled to said line at said receiving end thereof, a bistable electronic circuit having first and second elements which may both be selectively rendered conductive and non-conductive, first and second sources of control pulses coupled to said bistable circuit for selectively rendering said elements conductive and non-conductive, respectively, first and second potential sources at said sending station, said bistable circuit including means for coupling the potential of said first and second sources to said line in response to pulses from said first pulse source and for coupling the potential of only one of said sources to said line in response to pulses from said second pulse source, said signaling device including means for producing a distinctive signal in response to the coupling of both of said first and second potentials to said line.

10. The combination as set forth in claim 9 and including a third source of control pulses coupled to said bistable circuit, and means included in said bistable circuit for coupling a pulse to said first and second elements of said bistable circuit only when pulses from said first and third pulse sources are coincident.

11. The combination as set forth in claim 10 wherein the pulses from said third pulse source are time division multiplex pulses and are repeated in a given time slot in each of a given group of repetitive time frames, and wherein the individual pulses from said first pulse source have a duration equal to at least the time duration of a plurality of time frames.

12. The combination as set forth in claim 11 wherein said first and second elements are semi-conductor devices which are biased to non-conduction in response to each pulse from said second pulse source.

References Cited by the Examiner

UNITED STATES PATENTS 3,065,307 11/1962 Talcott -------------- 179—86

KATHLEEN H. CLAFFY, *Primary Examiner.*

H. ZELLER, *Assistant Examiner.*